United States Patent Office 3,310,559
Patented Mar. 21, 1967

3,310,559
PROCESS FOR THE CATALYTIC PRODUCTION OF MELAMINE FROM GASEOUS CYANIC ACID
Ferdinand Weinrotter, Linz, Walter Muller, Leonding, near Linz, Alfred Schmidt, Walter Bohler, and Johann Schweighofer, Linz, Austria, assignors to Osterreichische Stickstoffwerke Aktiengesellschaft, Linz, Austria
No Drawing. Filed Mar. 26, 1964, Ser. No. 355,064
Claims priority, application Austria, Apr. 4, 1963, A 2,704/63
8 Claims. (Cl. 260—249.7)

This invention relates to a process for the preparation of melamine from gaseous cyanic acid.

Numerous processes have been disclosed for the preparation of melamine from urea at normal or elevated pressure. In such processes urea or thermal decomposition products thereof are mixed with a known catalyst, the mixture is heated, and the melamine is obtained from the reaction mixture by sublimation or recrystallisation. In a continuous method, urea is introduced into a fluidised catalyst bed and the outgoing reaction gas is taken through a solid catalyst bed, this operation being repeated if necessary. Although the continuous method is preferable to the former method, it has been found that those catalysts which are active for the production of melamine do not have a high abrasion resistance and rapidly become abraded by dust in the fluidised bed. Moreover, urea decomposes on heating to give a number of thermal decomposition products which, if a catalyst is also present, may react in different ways with the catalyst. It will be apparent that the conditions in a fluidised catalyst bed in which urea is thermally decomposed at the same time as melamine is catalytically formed from the urea decomposition products, are not optimum conditions for all the simultaneous reactions, and the melamine yields cannot therefore reach maximum values.

We have discovered from earlier unpublished investigations that the hitherto substantially uncontrollable melamine synthesis conditions can be overcome by preparing melamine from cyanic acid, which can easily be produced in the pure state from urea.

Various catalysts have been found to be suitable for the melamine synthesis from cyanic acid, for example substances having a large internal surface such as silica gel and active alumina, or mixed oxides of various kinds with phosphorus pentoxide. According to one of the earlier proposals, use is particularly made of mixed oxides of phosphorus pentoxide with boron oxide, alumina, silica or ferric oxide, which preferably have an excess of phosphorus pentoxide of up to 50%. Ammonia, nitrogen or carbon dioxide or mixtures thereof may be used as the carrier gas. Since both the input and output substances of the melamine synthesis are gaseous the process may be performed continuously over a fixed catalyst and the melamine is separated from the reaction gas by cooling. No fluidised catalyst bed is necessary with its consequent abrasion of the catalyst grains.

Exhaustive tests have shown that a good yield of melamine and high purity are governed not so much by the choice of catalyst but by the choice of a number of steps concerned with thermal conditions during the synthesis, and as described hereinbelow, these form the subject of the present invention.

The reaction for forming melamine from cyanic acid in accordance with the equation $$6HCNO \rightarrow C_3N_3(NH_2)_3 + 3CO_2$$

wherein all the reactants are gaseous, is exothermic at 350° C. producing about 80 kcal./mole of melamine.

If the melamine synthesis from cyanic acid is performed with ammonia as the carrier gas in a tube furnace which is conventional for exothermic reactions and which contains the catalyst, a melamine yield of from 40 to 70% is obtained according to the test conditions.

The remainder of the unused cyanic acid is precipitated as ammonium cyanate on cooling of the reaction gas, and the ammonium cyanate then very rapidly isomerizes to urea. The separated melamine contains impurities, for example melamine cyanurate, which are all the more difficult to remove the lower the conversion.

The following temperature differences of the gases between the synthesis input and output are calculated from the exothermic reaction heat of the above equation for a gas mixture of cyanic acid and ammonia with different proportions of cyanic acid assuming a complete conversion of the latter to melamine and with an adiabatic reaction, i.e., without cooling of the catalyst bed:

| Percent by volume of HCNO (remainder $NH_3$): | Temperature rise, °C. |
|---|---|
| 10 | 111 |
| 15 | 158 |
| 20 | 204 |
| 25 | 247 |

Assuming for example an input gas temperature to the synthesis oven of 350° C., there is a temperature rise to 554° C. for a 20% by volume cyanic acid concentration in the input mixture, without cooling of the catalyst. This catalyst temperature is much too high. Exhaustive tests have shown that with previously known catalysts the formation of melamine from cyanic acid begins at 280° C., an optimum is reached at 420°–440° C., and the formation of melamine decreases again at 450°–480° C.

According to the prior art, the melamine synthesis would therefore be performed in tube furnaces and the catalyst would conventionally be cooled indirectly with mercury vapour or salt melts, to avoid the temperature of the catalyst from rising excessively. With melamine synthesis from cyanic acid by means of known fixed catalysts, this step does not give successful results. The yields are usually only 50 to 60%. The remainder of the non-converted cyanic acid is found in the form of ammonium cyanate or urea after the synthesis furnace. Tests have surprisingly clarified these conditions. The known melamine catalysts are so active that the main reaction in the formation of melamine from the gas mixture of cyanic acid and ammonia take place extremely rapidly. The reaction zone in the direction of the gas flow is therefore very short, about 10 cm., and the temperature in this zone is very high, often above 500° C. because of the intense exothermic effect. Owing to the poor thermal conductivity of the melamine catalysts used, for example silica gel, active alumina and boron phosphate, indirect catalyst cooling is not effective, for example in a tube furnace, because of the short reaction zone, and the melamine yields are poor as shown by the following example.

In a tube furnace cooled with mercury vapour at a temperature of 370° C. and with 1 metre long contact tubes each of a diameter of 21 mm., the catalyst filling was silica gel having a grain size of 3 to 7 mm. The input gas consisting of 20% by volume of cyanic acid and 80% by volume of ammonia had a temperature of 350° C. and a speed of flow of 20 litres per square centimetre tube cross-section of the one-metre long contact filling per hour. Under these conditions the conversion of cyanic acid to melamine was about 50% of the theoretical value.

Under the same test conditions the same yield of just 50% is obtained if the catalyst bed height of 1 metre is reduced to just 10 cm.

These and many other tests have shown that the cyanic acid is only incompletely converted to melamine in a short superheated catalyst zone. It was, however, surprising that the cyanic acid which had passed through the first short and hot reaction zone could not be converted to give any more melamine on the remaining catalyst of the 1-metre long catalyst bed, although such catalyst was very suitable for the reaction, and that ammonium cyanate and urea were found together with melamine after the furnace.

From this it may be concluded that the non-reacted cyanic acid has been transformed into another form, probably an isomeric form, which is no longer able to form melamine under the said synthesis conditions. The melamine formation and the conversion of cyanic acid to a form no longer suitable for the formation of melamine apparently take place simultaneously as competitive reactions.

The optimum conditions for forming melamine from cyanic acid using ammonia as a carrier gas with catalysts known for this reaction are obtained by the combination according to the invention of the following preferred steps, which are based on the above observations:

(1) The speed of flow of the gas through the catalyst zone must be extremely low and should not exceed 15, preferably 3 to 5 normal litres of cyanic acid and ammonia input gas mixture per sq. cm. of catalyst cross-section per hour (area of the catalyst filling).

(2) The input gas may contain only a limited amount of cyanic acid of 20% by volume, preferably 10–15% by volume. There is no industrial advantage in going below the limit values indicated under (1) and (2), while values in excess of the limits indicate a reduced melamine yield.

(3) The synthesis gas mixture of cyanic acid and ammonia should be introduced into the synthesis furnace at the lowest possible input temperature. It is practically impossible to go below a temperature of 280° C. in these conditions, since otherwise cyanuric acid will separate and clog the apparatus.

(4) The increase of heat due to the exothermic reaction should be dissipated without indirect cooling, i.e., in the form of perceptible heat of the reaction gas.

(5) The synthesis gas mixture passes through a catalyst bed of 10 to 50, preferably 20 to 40 cm. height in one pass.

(6) The horizontal extent of the static catalyst bed is adapted to the low speed of flow and the required conversion.

If these conditions are complied with, melamine yields of 85 to 98% of the theoretical amount are obtained. At the same time, a higher crude melamine yield means an increase in its purity, since undesirable impurities do not form until after the synthesis furnace on cooling of the reaction gas, as a result of reactions of the non-converted cyanic acid. In the case of very high melamine yields with a crude melamine purity of above 99.5%, it is not even necessary to recrystallise the same. In most cases such a crude melamine corresponds to the conventional market conditions for pure melamine. This is also an important technical advance in the manufacture of melamine. Further advantages of the process according to the invention are that the synthesis furnace requires neither heating nor cooling during continuous operation in the case of the adiabatic reaction. The single gas pass through wide flat catalyst hurdles of a bed height of about 30 cm. simultaneously determines the most suitable form of furnace. Optimum results are obtained by observing all the above requirements. If just some of these requirements or combinations of just some of them are used then naturally the results are only partially successful. The conditions specified in point 1, 2 and 3 above, are to be observed jointly at any rate.

The cyanic acid/ammonia gas mixture obtained by the above-described urea splitting is advantageously used directly for the melamine synthesis.

The following examples illustrate the invention.

*Example 1*

5,000 litres (referred to 0° C. and 760 Torr) of a cyanic acid/ammonia gas mixture at a temperature of 290° C., containing approximately 15% by volume of cyanic acid gas, was passed per hour in a uniform flow under normal atmospheric pressure through a catalyst bed disposed on a perforated plate in a cylindrical synthesis furnace. The catalyst bed consisted of commercial silica gel of a grain size of 3 to 7 mm. The loose catalyst filling occupies a cylindrical space having a diameter of 36 cm. and a height of 30 cm. The cross-section or the surface of this catalyst bed is accordingly about 1000 sq. cm. The speed of flow of the input gas mixture referred to the area of the catalyst filling, is adjusted to about 5 litres per sq. cm. per hour.

Given an input gas content of 15% by volume of cyanic acid, 1440 g. of cyanic acid per hour were introduced into the synthesis furnace and converted to 675 g. of melamine at a maximum measured catalyst temperature of 440° to 450° C. This corresponds to a yield of about 96% of the theoretical value. The melamine was separated from the hot reaction gas after passing through the synthesis furnace by direct cooling with water and was obtained by filtration and drying. A small quantity of non-converted cyanic acid was found in the form of dissolved urea in the cooling water. The crude melamine obtained had an analytically determined nitrogen value of 66.45 to 66.60% N (theoretical value for melamine: 66.64% N), without further recrystallisation, and corresponded to conventional test provisions for pure melamine with a purity of about 99.3%.

If the speed of flow of the input gas mixture is raised to 18 litres per sq. cm. of catalyst area per hour under otherwise identical conditions to those indicated above, the melamine yield drops to 75% of the theoretical amount. The melamine yield also drops to 70% if the cyanic acid concentration is raised from 15% by volume to 22% by volume under otherwise identical conditions to those indicated before. The purity of the crude melamine with melamine yields of less than 80% is generally below 96%.

*Example 2*

Under otherwise identical conditions to those indicated in Example 1, a cyanic acid/ammonia gas mixture having a cyanic acid content of 13% by volume was passed over a boron phosphate catalyst at a speed of flow of 2 litres per sq. cm. of catalyst cross-section per hour. The melamine yield was 92% of the theoretical value for a gas input temperature of 310° C. before the synthesis furnace. The crude melamine had a purity of 99%.

*Example 3*

As in Examples 1 and 2, a cyanic acid/ammonia mixture containing 14% by volume of cyanic acid and at a speed of flow of 3 litres per sq. cm. of catalyst cross-section per hour was passed over a commercial active alumina catalyst. The gas input temperature before the synthesis furnace is 300° C. The melamine yield was 98% of the theoretical value. The crude melamine had a purity of 99%.

We claim:

1. In a process for the synthesis of melamine which comprises passing a mixture of gaseous cyanic acid and ammonia gas through a catalyst for such synthesis, the improvements according to which the said mixture contains not more than 20% by volume of cyanic acid, the flow rate of the input gas mixture is not in excess of 15 normal liters per square centimeter of catalyst per hour, and the input gas temperature is between 280° and 350° C.

2. In a process for the synthesis of melamine which comprises passing a mixture of gaseous cyanic acid and ammonia gas through a catalyst for such synthesis, the improvements according to which the said mixture contains not more than 20% by volume of cyanic acid, the flow rate of the input gas mixture is not in excess of 3 to 5 normal liters per square centimeter of catalyst per hour, and the input gas temperature is between 280° and 350° C.

3. In a process for the synthesis of melamine which comprises passing a mixture of gaseous cyanic acid and ammonia gas through a catalyst for such synthesis, the improvements according to which the said mixture contains not more than 10 to 15% by volume of cyanic acid, the flow rate of the input gas mixture is not in excess of 15 normal liters per square centimeter of catalyst per hour, and the input gas temperature is between 280° and 350° C.

4. In a process for the synthesis of melamine which comprises passing a mixture of gaseous cyanic acid and ammonia gas through a catalyst for such synthesis, the improvements according to which the said mixture contains not more than 20% by volume of cyanic acid, the flow rate of the input gas mixture is not in excess of 15 normal liters per square centimeter of catalyst per hour, the catalyst is in the form of a catalyst bed of a height of 10 to 50 centimeters, and the input gas temperature is between 280° and 350° C.

5. In a process for the synthesis of melamine which comprises passing a mixture of gaseous cyanic acid and ammonia gas through a catalyst for such synthesis, the improvements according to which the said mixture contains not more than 20% by volume of cyanic acid, the flow rate of the input gas mixture is not in excess of 15 normal liters per square centimeter of catalyst per hour, the catalyst is in the form of a catalyst bed of a height of 20 to 40 centimeters, and the input gas temperature is between 280° and 350° C.

6. A process according to claim 1, in which the gaseous mixture flows in a simple passage through a static catalyst bed.

7. A process according to claim 1, in which the reaction heat is dissipated as perceptible heat of the reaction gas mixture.

8. A process according to claim 1, in which for a given height the horizontal extent of the catalyst bed is adapted to the required conversion and the low speed of flow of the synthesis gas mixture.

References Cited by the Examiner
UNITED STATES PATENTS 3,112,312  11/1963  Veltman _____ 260—249.7

FOREIGN PATENTS 537,990  3/1957  Canada.
560,215  7/1958  Canada.

WALTER A. MODANCE, *Primary Examiner.*

JOHN M. FORD, *Assistant Examiner.*

Dedication 3,310,559.—*Sterling Beckwith*, Libertyville Township, Ill. MULTIPLE JET CONDITIONING CABINET. Patent dated Apr. 28, 1964. Disclaimer filed Apr. 10, 1972, by the assignee, *Kysor Industrial Corporation*. Hereby enters this disclaimer to claims 1, 2, 5 and 6 of said patent.

[*Official Gazette, June 6, 1972.*]